March 29, 1927.  W. F. GILLESPIE  1,622,713
MOUNTING FOR TYPEWRITERS AND THE LIKE
Filed Jan. 24, 1925
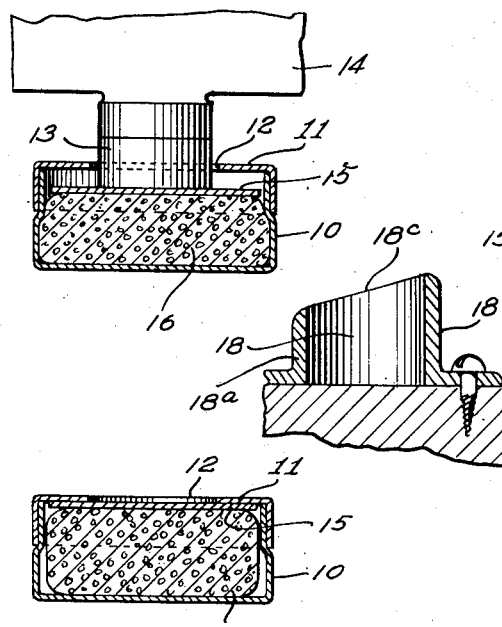
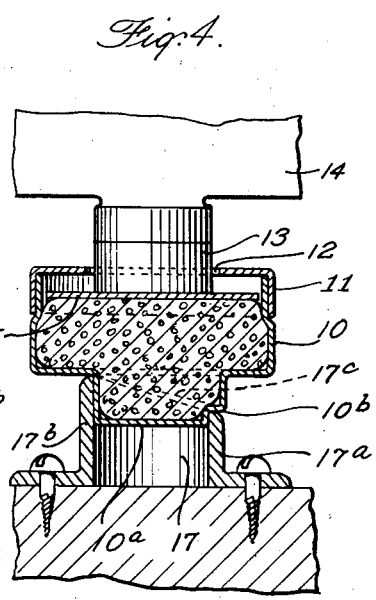
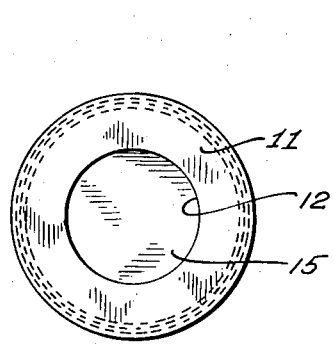
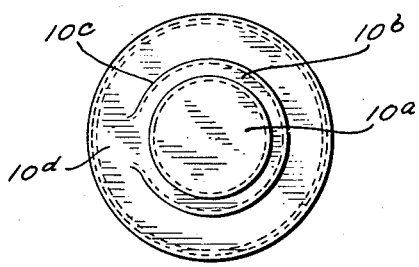
INVENTOR
William F. Gillespie
BY Robert S. Blair
ATTORNEY Patented Mar. 29, 1927.

1,622,713

UNITED STATES PATENT OFFICE.

WILLIAM F. GILLESPIE, OF STAMFORD, CONNECTICUT, ASSIGNOR TO STAMFORD RUBBER SUPPLY COMPANY, A CORPORATION OF CONNECTICUT.

MOUNTING FOR TYPEWRITERS AND THE LIKE.

Application filed January 24, 1925. Serial No. 4,447.

This invention relates to mountings for typewriters and the like. One of the objects thereof is to provide a device of the above nature practical and efficient and capable of meeting the requirements of use in a highly satisfactory manner. Another object is to provide a device of the above nature adapted materially to lessen the noise occasioned by the operation of a typewriter or similar machine. Another object is to provide such a device which is simple and inexpensive and thoroughly practical. Another object is to provide a device of the above nature readily adaptable to varying conditions of use. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawing in which is shown one or more various possible embodiments of the several features of this invention, Figure 1 is a vertical section of a supporting device showing the device in use;

Figure 2 is a vertical section showing the device not in use;

Figure 3 is a top plan view of Fig. 2;

Figure 4 is a vertical section similar to Fig. 1 showing a slightly modified form in use, and Figure 5 is a bottom plan view of the device shown in Fig. 4.

Similar reference characters refer to similar parts throughout the several views of the drawing.

Referring now to Figure 1 of the drawing in detail, there is shown a casing 10 preferably of sheet metal and provided with a removable cover 11. The cover 11 is provided with a circular opening 12 projecting through which to the interior of the casing is shown the leg or foot 13 of a typewriter or similar machine 14. The leg or foot 13 is of the usual type found on typewriters, being of short length, cylindrical in shape and generally made of rubber. Inside the casing 10 the leg 13 rests upon a member 15 which preferably takes the form of a thin disk loosely fitting the interior walls of the casing. This disk 15 is preferably made of some substantially rigid and non-yielding material such, for example, as a stiff fiber board.

Within the casing 10, beneath the member 15, is a member 16 which is of a yielding and highly resilient nature. The material of which this member 16 is preferably made is a composition having qualities of resiliency somewhat similar to those of rubber and known as "molded rubber factice". This material, as is shown in the drawing, is of a spongy character, being provided with a multitude of individual air cells of substantial size. It is highly resilient and yielding. In normal distended position the member 16 substantially fills the space within the casing 10, holding the member 14 snugly up against the inner surface of the cover 11, as shown in Figure 2.

The area of the top surface of the member 16 is preferably substantially greater than the area of the bottom surface of the leg 13. If the leg 13 were permitted to rest directly upon the surface of the resilient member 16, the weight of the typewriter would be concentrated at the center of the member, compressing the same locally to such an extent as to collapse the air cells thereof and decrease its effectiveness for the purpose which will be later pointed out. The substantially non-yielding member 15 distributes over the entire area of the member 16, the weight imposed by the leg 13, thus increasing the area of the member 16 against which the weight of the typewriter is exerted. The result is that the member 16 is not locally compressed to so great an extent, and the air cells thereof are not collapsed. Moreover, this even distribution of pressure lengthens the life of the member 16.

As is well known, the objectionable noise occasioned by the operation of a typewriter or similar machine is caused largely by the vibrations which are transmitted through the legs of the typewriter to the desk or table upon which it is supported. The relatively large area of the desk or table acts as a sounding board, amplifying the sound waves caused by the vibration of the typewriter. The member 16 is of such nature that it offers an extremely high resistance to the passage of vibrations therethrough. In the first place, the high resiliency of the material of which the member 16 is composed has the effect of greatly lessening or absorbing the vibrations which are transmitted to it from the leg 13. The inherent resiliency of the rubber factice of which the member 16 is composed, is increased by the pressure of the air cells. In the second place, the cellular structure of the member decreases its density to a great extent, and a member of very low density is a very poor conductor of sound vibrations. The low density of the member 16 impedes the transmission of sound vibrations therethrough to such an extent that substantially no vibrations reach the bottom of the member to be transmitted to the desk or table upon which the typewriter is supported. The multitude of air cells effect the absorption of the sound vibrations, preventing their passage through the member.

The casing 10 holds the member 16 against lateral distortion and with the cover 11 and the member 15 protects the member 16 from air and dirt while in use. The cover 11 at the opening 12 fits closely about the leg 13 so that little or no dirt or other material can enter at such point.

As has been mentioned above, and as is shown in Figure 2, the member 16 when the device is not in use holds the disk 15 snugly up against the inner surface of the cover 11. Thus when the device is not in use the opening 12 is tightly closed by the member 15. The parts thus form a tight inclosure for the member 16, protecting the latter from air and moisture, and the devices may thus be shipped without need of further packing.

A large number of typewriters in service are mounted in a well-known type of folding desk in which they are secured upon a swinging support and may be swung thereon into a concealed position when not in use. In such desks, the legs of the typewriters usually rest in cup-shaped receptacles of the type shown at 17 and 18 in Figure 4. Four of these receptacles are provided, one for each leg of the typewriter, and the typewriter is clamped downwardly thereinto. In the drawing, the two receptacles shown are viewed from the side, one being adapted to receive a forward leg and the other a rear leg of the typewriter. The forward wall 17$^a$ of the forward receptacle 17 is lower than the rear wall 17$^b$ thereof, and the rear wall 18$^a$ of the rear receptacle 18 is lower than the forward wall 18$^b$ thereof, the top surfaces 17$^c$ and 18$^c$ of the receptacles sloping as shown. The purpose of this construction is to facilitate the placing of the typewriter in position, it being possible to first position the rear legs in the receptacles and then swing the forward legs into their receptacles.

In Figures 4 and 5 there is shown a modified form of the mounting of this invention adapted for coacting with these receptacles. The casing 10 containing the porous resilient member 16 and the member 15 is provided in its lower surface with a projection 10$^a$ adapted to fit into the receptacles 17 or 18. This projection 10$^a$ is preferably provided with a sloping shoulder 10$^b$ which mates with and rests upon the sloping surface of the receptacle. This sloping shoulder is preferably so formed that it rests at its lowest portion upon the lowest portion 17$^a$ of the wall of the receptacle, and thence sloping upwardly rests upon the sloping side walls of the receptacle, merging into the main portion of the casing 10 at its upper portion along the line 10$^c$ (Fig. 5), the lower surface 10$^d$ of the main portion of the casing 10 thus resting upon the highest portion 18$^b$ of the wall of the receptacle. The member 16 is preferably formed at its lower portion to extend downwardly into and substantially conform to the shape of the projection 10$^a$ of the casing. By means of this construction, the typewriter mounting of this invention is made to coact with the general types of folding desks and at the same time the full advantages of the member 16 and other parts described above are realized.

It will thus be seen that there is herein provided a construction which embodies the features of this invention and attains the objects thereof and that the same is well adapted to meet the requirements of practical use.

As many possible embodiments may be made of the above invention, and as many changes might be made in the embodiment above set forth, it is to be understood that all matter hereinbefore set forth is to be interpreted as illustrative and not in a limiting sense.

I claim as my invention:

1. A device for supporting a typewriter or the like comprising, in combination, a substantially cup-shaped casing member, a pad of resilient and porous material substantially filling said casing member, a tightly fitting cover for said casing member, and a solid and substantially rigid plate member resting freely within said casing between the upper surface of said pad and the inner surface of said cover, said cover having an opening of a size to permit passage of the typewriter leg, the typewriter leg being adapted to enter said opening and rest freely upon the surface of said plate, said plate being of greater area than said opening and closing said opening under the upward urge of said resilient pad so that said pad is completely enclosed when the device is not in use.

2. A device for supporting a typewriter or the like comprising, in combination, a substantially cup-shaped casing member having a main upper portion and a lower portion of reduced size shaped to enter and rest in the cup-shaped leg-receiving member of a folding typewriter desk, a pad of resilient and porous material substantially filling said casing member, a tightly fitting cover for said casing member, and a solid and substantially rigid plate member resting freely within said casing between the upper surface of said pad and the inner surface of said cover, said cover having an opening of a size to permit passage of the typewriter leg, the typewriter leg being adapted to enter said opening and rest freely upon the surface of said plate, said plate being of greater area than said opening and closing said opening under the upward urge of said resilient pad so that said pad is completely enclosed when the device is not in use.

In testimony whereof, I have signed my name to this specification this thirteenth day of January 1925.

WILLIAM F. GILLESPIE.